June 18, 1940.  E. E. ARNOLD ET AL  2,205,235
VALVE OPERATOR
Filed March 31, 1938   5 Sheets-Sheet 1

WITNESSES:
Leon M. Garman
Joe Weber

INVENTORS
Edwin E. Arnold and
Robert S. Elberty, Jr.
BY Crawford
ATTORNEY

June 18, 1940.  E. E. ARNOLD ET AL  2,205,235
VALVE OPERATOR
Filed March 31, 1938  5 Sheets-Sheet 2

WITNESSES:
Leon M. Garman
Joe Weber

INVENTORS
Edwin E. Arnold and
Robert S. Elberty, Jr.
BY
G. M. Crawford
ATTORNEY

June 18, 1940.	E. E. ARNOLD ET AL	2,205,235
VALVE OPERATOR
Filed March 31, 1938	5 Sheets-Sheet 3
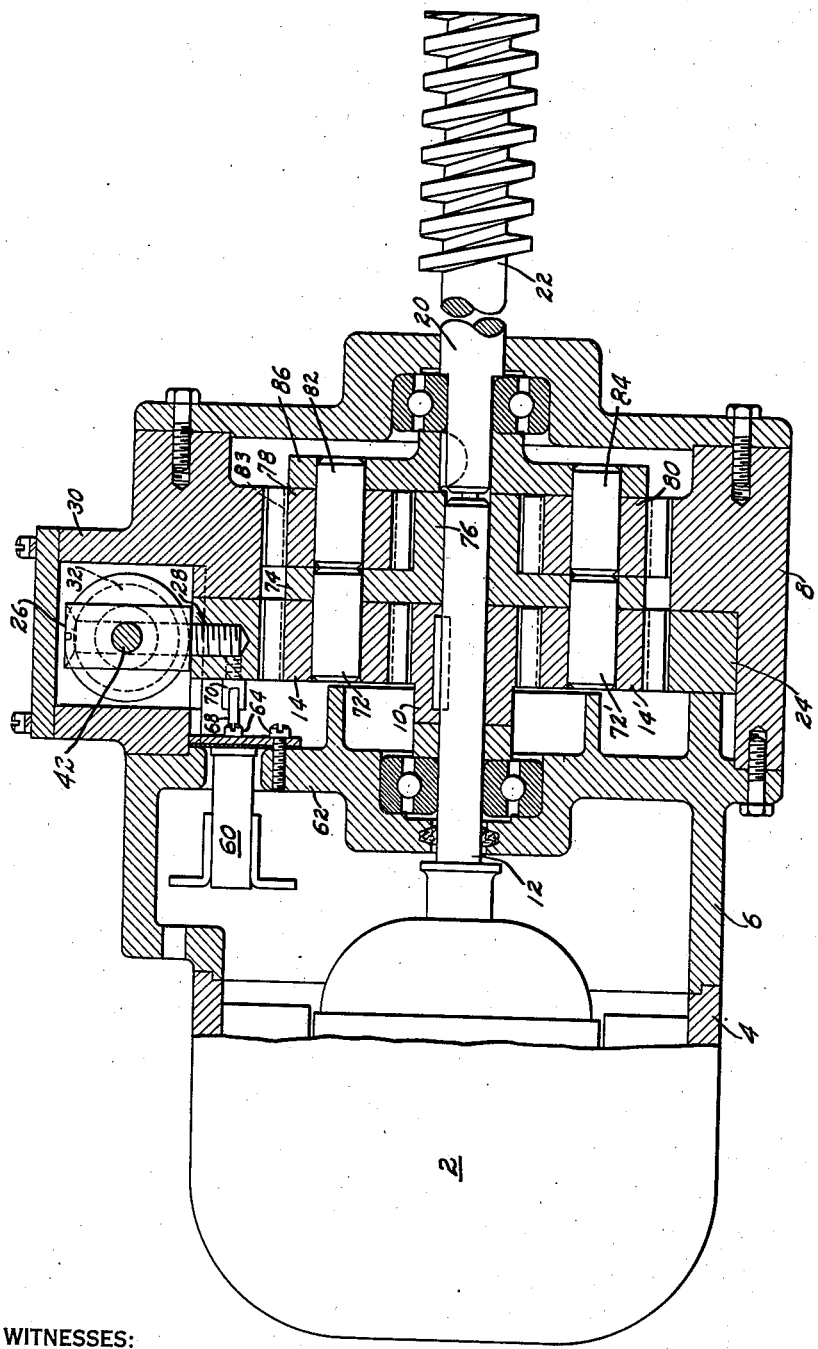
WITNESSES:
INVENTORS
Edwin E. Arnold and
Robert S. Elberty, Jr.
BY
ATTORNEY June 18, 1940.  E. E. ARNOLD ET AL  2,205,235
VALVE OPERATOR
Filed March 31, 1938   5 Sheets-Sheet 4

WITNESSES:
Leo M. Garman
Joe Weber

INVENTORS
Edwin E. Arnold and
Robert S. Elberty, Jr.
BY G. M. Crawford
ATTORNEY

June 18, 1940.  E. E. ARNOLD ET AL  2,205,235
VALVE OPERATOR
Filed March 31, 1938   5 Sheets-Sheet 5

WITNESSES:

INVENTORS
Edwin E. Arnold and
Robert S. Elberty, Jr.
BY
ATTORNEY

Patented June 18, 1940

2,205,235

UNITED STATES PATENT OFFICE 2,205,235

VALVE OPERATOR

Edwin E. Arnold, Pittsburgh, and Robert S. Elberty, Jr., Waynesboro, Pa., assignors to Westinghouse Electric & Manufacturing Company, East Pittsburgh, Pa., a corporation of Pennsylvania Application March 31, 1938, Serial No. 199,320

8 Claims. (Cl. 74—291)

Our invention relates, generally, to operators for fluid valves and, more particularly, to motor-operated valves with automatic control.

In fluid distribution systems, the separate valves of the system are often motor driven to the desired open or closed position, the control for the motors being situated at a central control station.

The object of our invention is to provide a motor-driven valve operator which shall function to actuate the valve to the desired open or closed position, and to automatically deenergize the drive motor when the valve has reached the desired open or closed position.

Another object of the invention is to provide a motor-driven valve operator which shall function to actuate the valve to the desired open or closed position, and to automatically deenergize the motor in response to the increased torque exerted by the motor when the valve has reached the desired open or closed position.

A further object of the invention is to provide a control system for a valve which shall function to actuate the valve selectively to open or closed position and deenergize the actuating means when the selected position has been reached.

Another object of the invention is to provide a motor-operated control unit for fluid valves which shall be compact and sturdy, reliable in operation, and inexpensive to manufacture.

These and other objects and advantages of the invention will be apparent from the following detailed description taken in connection with the accompanying drawings, in which:

Fig. 4 is a side elevation view, partly in section, of an alternative form of drive mechanism for a valve operator;

In carrying out our invention, we provide a reversible drive motor for actuating a valve and provide a reduction gear for the driving connection between the motor and the valve operating stem. The driving force from the motor to the valve stem is made to react against a spring member which is so adjusted as to yield under predetermined torque transmitted by the motor. When the valve has been moved to full open or closed position and stops, the torque of the motor increases and causes the spring to yield to move a circuit control means to deenergize the motor. Control systems are provided for selectively energizing the motor for rotation in the desired direction.

Figure 1:
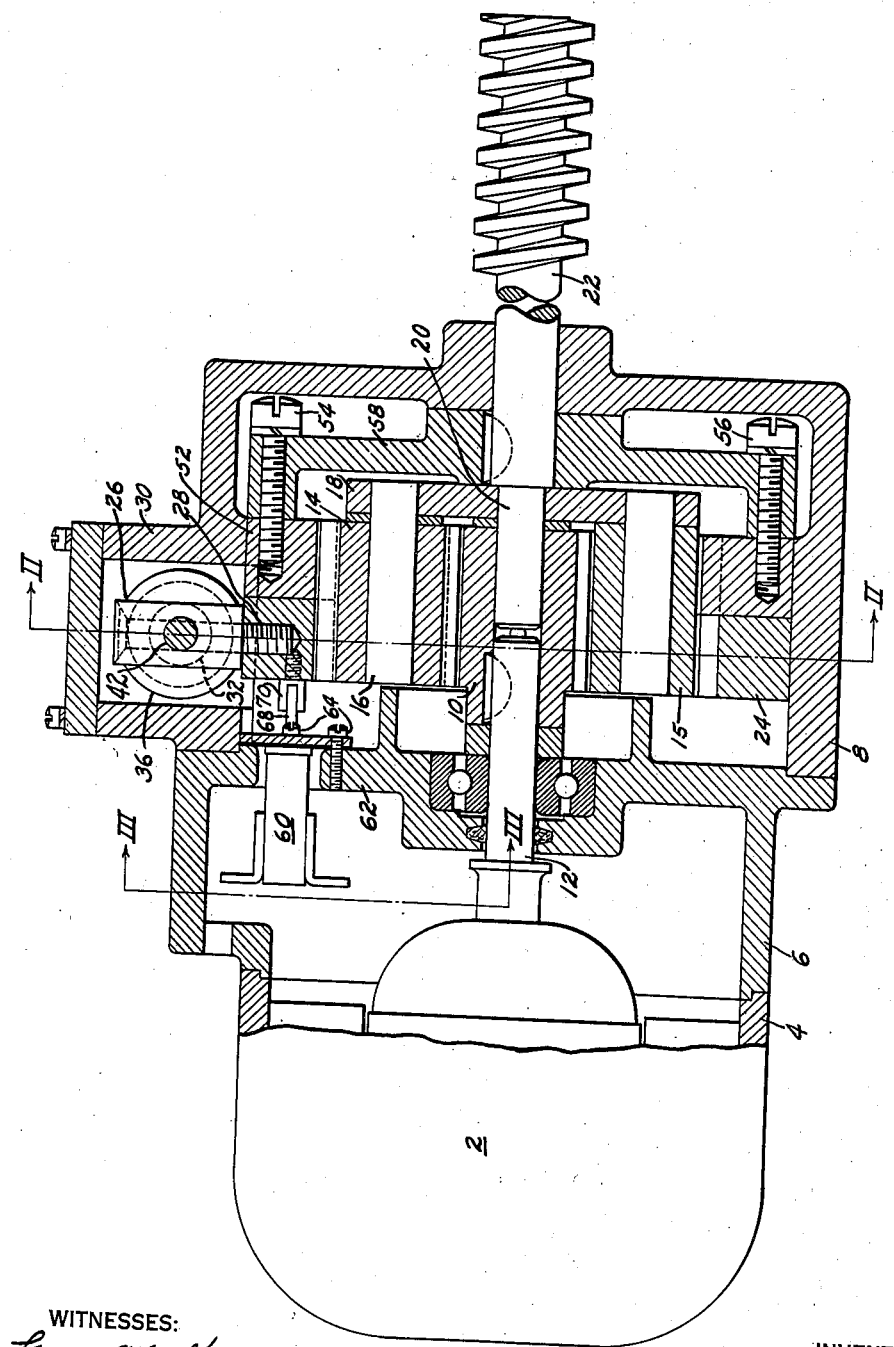
Figure 1 is a side view, partly in section, showing the cooperative relationships of the elements of a preferred embodiment of the device of our invention.

Referring now to Fig. 1 of the drawings, a motor 2 has its housing 4 secured in any suitable manner to a bracket member 6, which in turn is secured in any suitable manner to a gear housing member 8. Within the gear housing 8 a sun gear 10 is secured to a shaft 12 of the motor 2 by key members as shown. A planet gear 14 is mounted rotatably upon a pin member 16 which is secured in any suitable manner to a plate member 18. The plate member 18 is mounted for rotation upon a shaft 20 which is an extension of the operating stem 22 of a fluid valve (not shown). A balance member 15 of approximately the same weight as the planet gear 14 is mounted on the plate member 18 to provide a better balance of the rotating parts so that the mechanism will run smoothly. A second planet gear similar to the planet gear 14 may be substituted for balance member 15 if desired.

Figure 2:
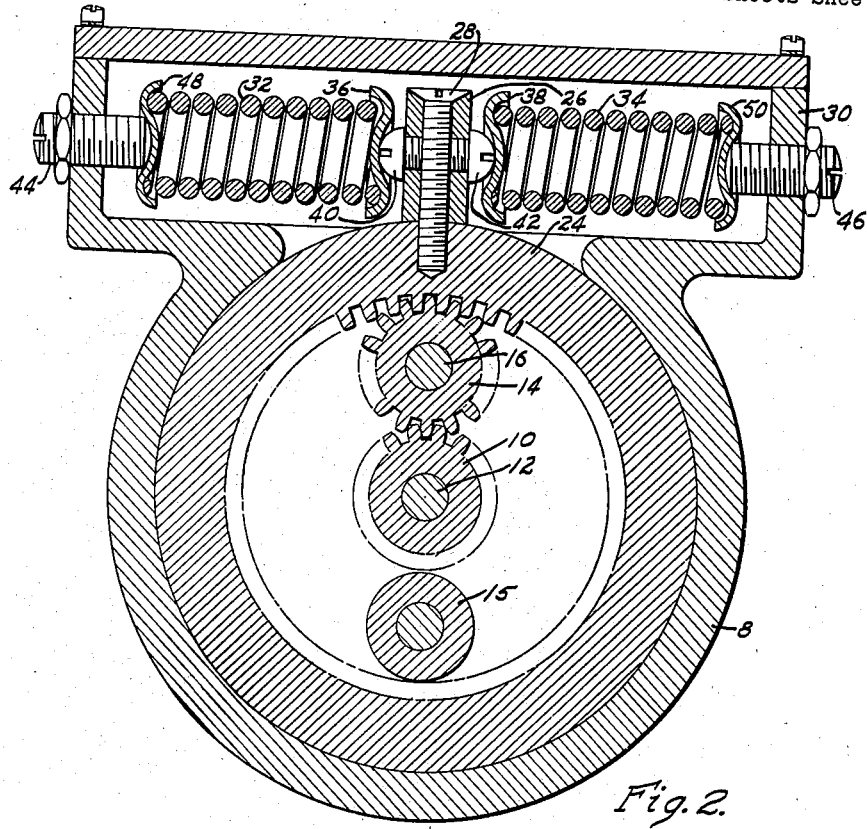
Fig. 2 is a view, partially in section, taken along line II—II of Fig. 1.

An internal ring gear 24 is rotatably mounted in the housing 8 in cooperative relation with the planet gear 14. An arm 26 is secured by a screw 28 to the ring gear 24 and extends radially into the box member 30 of the housing 8. The relation of the sun, planet and internal ring gears is best shown in Fig. 2, which is a sectional view along line II—II of Fig. 1.

The arm 26 is positioned between the spring members 32 and 34 which bear against the cap members 36 and 38, which in turn engage the heads of screws 40 and 42 in the arm 26. The tension of the spring members 32 and 34 may be adjusted by the screw members 44 and 46 which extend through the end walls of the box member 30 and engage the cap members 48 and 50, which bear upon the ends of the springs 32 and 34, respectively.

Also positioned for rotation in the housing 8 is an internal ring gear 52 which is positioned to cooperate with the planet gear 14. The ring gear 52 has either a greater or a smaller number of teeth than the ring gear 24, so that each time planet gear 14 traverses the ring gears 24 and 52, the ring gear 52 will be advanced a distance proportional to the difference in the number of teeth on the ring gears 24 and 52. The ring gear 52 is secured by suitable screw members 54 and 56 to a plate member 58, which in turn is keyed, as shown, to the shaft 20.

A circuit control device 60 is secured to the inner wall 62 of the bracket member 6 by means of the screw members 64, and has an operating pin 68 extending into the housing 8. A pin member 70 is secured to the ring gear 24 in operative relation with the operating pin 68 of the circuit control device so that the circuit control device 60 will be operated when the ring gear 24 is displaced from the position in which it is normally held by the spring members 32 and 34. The circuit control device 60 may be any suitable switching device which is capable of selectively closing one or the other of two circuits in response to the actuation of the operating pin in one direction or the other by means of the pin 70.

Figure 3:
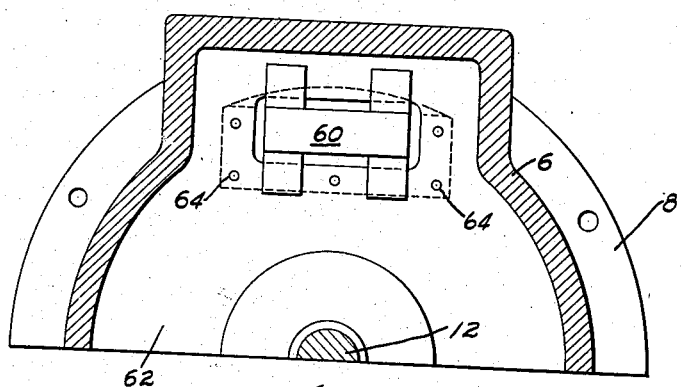
Fig. 3 is a view, partially in section, taken along line III—III of Fig. 1.

In the operation of the device as shown in Figs. 1, 2 and 3, the motor 2 will drive the sun gear 10, which in turn will drive the planet gear 14 to cause it to rotate upon the ring gear 24 and to rotate the ring gear 52, which in turn will operate the valve stem 22 to actuate the valve to either closed or open position depending upon the direction of rotation of the motor 2. When the valve driven by the valve stem 22 reaches its extreme limit of travel to the open or closed position, the movement of the stem 22 will stop and the reaction between the planet gear 14 and the ring gear 24, caused by the stopping of the valve stem 22 and the ring gear 52, will cause the ring gear 24 to be displaced against the tension of either the spring member 32 or the spring member 34, depending upon the direction of rotation of the motor 2. This displacement of the ring gear 24 will cause the pin 70 to engage the pin 68 to operate the circuit control device 60. The circuit control device 60 may be connected in any suitable manner in the circuit of the motor 2 to deenergize the motor 2 when the switch is actuated.

In Fig. 4 there is shown another form of the invention in which the reduction gearing comprises a pair of planetary gear trains in tandem. Like elements in this form of the invention and the form of the invention shown in Figs. 1, 2 and 3 are designated by the same reference characters. In this form of the invention, a sun gear 10 is keyed to the shaft 12 and actuates the planet gears 14 and 14', which in turn cooperate with the internal ring gear 24. The planet gears 14 and 14' are rotatable upon the pins 72 and 72', respectively, which are secured to a plate member 74. The plate member 74 has a sun gear element 76 extending therefrom in driving relation with the planet gears 78 and 80. Planet gears 78 and 80 are rotatable upon the pins 82 and 84, which are secured to the plate member 86, which in turn is keyed to the shaft 20 which operates the valve stem 22. Rotation of the plate member 86 is produced by cooperation of the planet gears 78 and 80 with a stationary internal ring gear 83 which is shown formed integral with the housing member 8 but which may be a separate gear element secured to the housing member.

In the operation of the form of the invention shown in Fig. 4, the power will be transmitted from the motor 2 to the valve stem 22 through the reduction gearing comprising the two planetary gear trains in tandem, and when the valve has reached its limit of movement, the reaction between the planet gears 14 and 14' and the ring gear 24 will so displace the ring gear 24 against the bias of its positioning springs 32 and 34 as to cause the pin 70 to engage pin 68 to actuate the circuit control device 60 and thus deenergize the motor 2.

Figure 5:
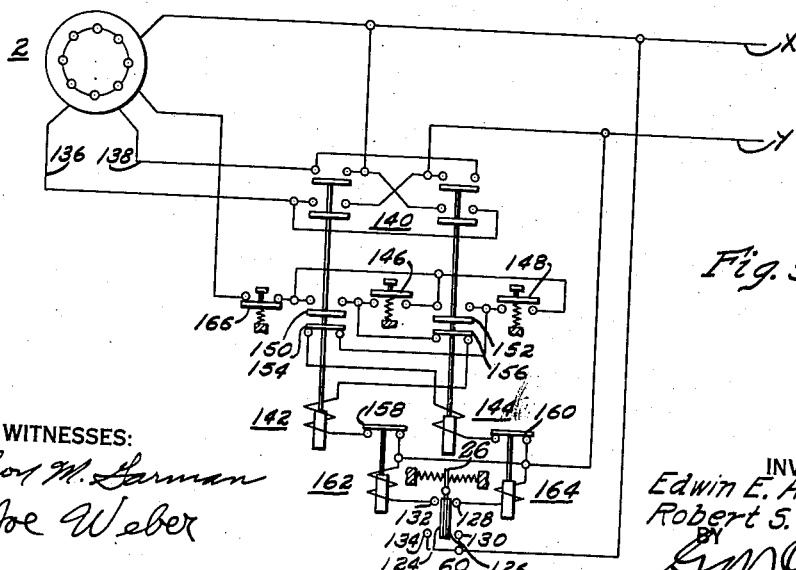
Fig. 5 is a diagrammatic illustration of a control system for actuating the valve operators of Figs. 1–4.

In Fig. 5 there is shown one system of control for a valve actuating motor which may be used with either of the embodiments of the invention of Figs. 1, 2, 3 and 4. The motor 2 shown in Fig. 5 is illustrated as a single-phase induction motor having its main field winding connected to the source of power represented by conductors X and Y. Its starting field winding may be connected by means of the conductors 136 and 138 through a reversing switch 140. The reversing switch 140 comprises the contact elements of the relays 142 and 144, which may be selectively energized by the selectively actuable switching devices 146 and 148, respectively, which may be push button switches. The contact elements 150 and 152 of the relays 142 and 144 act in holding circuits to maintain their respective relays energized after their selective energization by the closing of the switching devices 146 and 148. The back contact elements 154 and 156 of the relays 142 and 144, respectively, act as lockouts for the relays 144 and 142, respectively, to prevent energization of one of these relays while the other one is energized. The contact elements 158 and 160 of the relays 162 and 164 are connected in circuit with the coils of the relays 142 and 144, respectively, so as to deenergize the relays 142 and 144, respectively, upon the energization of the relays 162 and 164, respectively. A switch device 60 comprising the conductor elements 124 and 126 and the contact elements 128 and 130, and 132 and 134, which specific conductor and contact elements are not shown in the embodiment of the device of Figs. 1, 2, 3 and 4, are connected to energize the relay 162 or the relay 164, depending upon the direction of displacement of the arm 26. A normally closed manually operable switching device 166 is provided in the common holding circuit for the relays 142 and 144 so that the motor may be manually stopped at any desired point in the actuation of the valve operated thereby.

In the operation of the control system of Fig. 5, when it is desired to actuate the valve to closed position, the switching device 146 is actuated to effect the energization of the relay 142 which operates to close its contact element 150 and to open its contact element 154, and to actuate the reversing switch 140 so as to select the proper direction of operation of the motor 2. Contact element 150 closes the holding circuit for the relay 142 and contact element 154 opens the operating circuit of the relay 144, rendering the switch device 148 ineffective to energize the relay 144. If it is desired to stop the operation of the motor 2 at any time, the holding circuit for the relay 142 may be deenergized by actuating the switching device 166. When the motor 2 has moved the valve operated thereby to its full closed position, the reaction in the mechanical power transmitting elements between the motor and the valve shown in each of the three embodiments of the invention caused by the increased torque due to the stopping of the valve, will cause the conductor element 124 to engage the contact elements 132 and 134 to thereby energize the relay 162 which opens its contact element 158 to break the holding circuit of the relay 142. The elements of the control system will then be in the positions shown in Fig. 5, and the valve may be actuated in the reversed direction in a similar manner by closure of the switching device 148.

Figure 6:
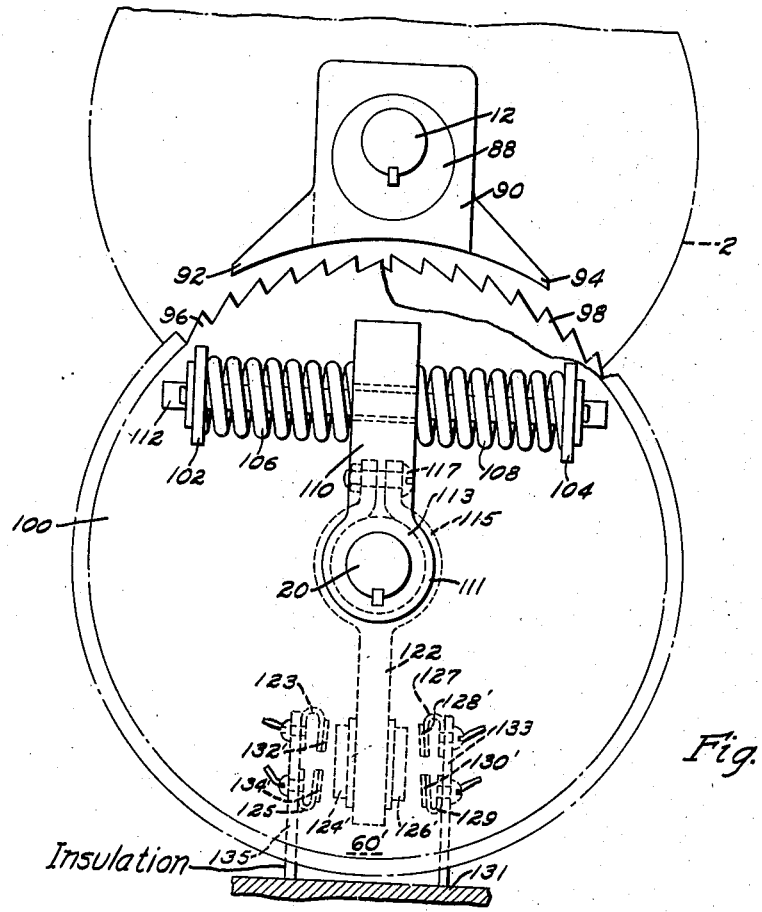
Figs. 6 and 7 are front and side elevation views of the main operating parts of a third form of our invention.
Figure 7:
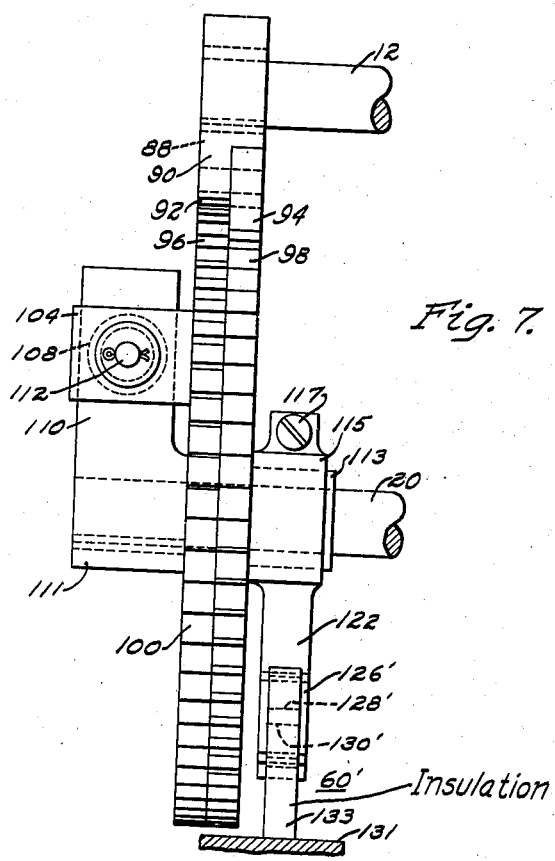

A third form of the invention is shown in Figs. 6 and 7, and in this form of the invention a shaft 12 of a motor 2, indicated by a broken line, is keyed to a cam member 88 which carries and rotates within a pawl member 90. The pawl member 90 has a pair of tooth engaging shoulders 92 and 94 which cooperate with two series of oppositely disposed tooth members 96 and 98 on the disc 100. The series of tooth members 96 and 98 are so shaped as to permit the shoulders 92 and 94 of the pawl 90 to cooperate therewith to rotate the disc 100 in one direction or the other, depending upon the direction of rotation of the motor shaft 12. Thus when the motor shaft 12 rotates in the clockwise direction, as viewed in Fig. 6 of the drawings, the shoulder 94 of the pawl member 90 will engage the series of teeth 98 and step the disc 100 around in the clockwise direction a distance of one tooth width for each revolution of the shaft 12. In a like manner, when the shaft 12 rotates in the counter-clockwise direction, the shoulder 92 will engage the teeth 96 to rotate the disc 100 in a counter-clockwise direction.

The shoulder members 102 and 104 are secured to the disc member 100, and have bearing against them the spring members 106 and 108, respectively, which also bear against an arm 110 to transmit rotational movement to the arm when the disc member 100 rotates. A pin member 112 extends through the spring members 106 and 108 and the shoulders 102 and 104 to properly center the spring members.

The arm 110 has a collar portion 111 which is keyed to the operating shaft 20 of the valve. The disc 100 has a sleeve member 113 fixed thereto, both the sleeve 113 and the disc 100 being rotatable on the shaft 20. A split collar member 115 is mounted in frictional engagement with the sleeve 113, and has arms extending radially therefrom engaged by a bolt 117 so that the proper sliding frictional engagement between the collar 115 and the sleeve 113 may be established. An arm 122 is secured to the collar member 115 and serves as the operating member for the circuit control unit 60'. The circuit control unit 60' comprises contact elements 128' and 130' suitably secured to a fixed support member 131 by a strip of insulating material 133 to which they are attached by resilient members 127 and 129 positioned in cooperative relation with a bridging conductor element 126' carried by the arm 122. In a like manner the contact elements 132' and 134' are fixed to a strip of insulating material 135 by resilient members 123 and 125, the strip 135 being supported by the member 131, and are positioned in cooperative relation with the bridging conductor 124' carried by the arm 122.

The frictional engagement between the collar 115 and the sleeve 113 is such as to permit the sleeve 113 to rotate the arm 122 when the disc 100 is rotated in either direction, and to also permit the sleeve 113 to rotate with respect to the collar 115 when the movement of the arm 122 has been stopped by engagement of either the conductor element 124' or the conductor element 126' with its cooperating fixed contact elements.

In the operation of the device of Figs. 6 and 7, the motor 2 will act through the pawl and ratchet members to rotate disc 100, and the rotation of disc 100 will be transmitted through the spring members 106 and 108 to the arm 110, which in turn will rotate the operating shaft 20 of the valve. The arm 122 will rotate with the shaft 20 until either the conductor member 124' or the conductor member 126', depending upon the direction of rotation, engages its cooperating fixed contact elements. The conductor members 124' and 126' will remain in this closed circuit position with their cooperating contact elements while the collar 115 slides upon the sleeve 113 as the disc 100 continues to rotate. When the valve operated by the shaft 20 reaches its full open or closed position, the shaft 20 will be stopped, and the stopping of the shaft 20 will in turn cause the arm 110 to stop rotating. The pawl 92 or the pawl 94, depending upon the direction in which the valve is being operated, will tend to continue to rotate the disc 100, however, against the tension of either the spring 106 or the spring 108, which is the driving link between the disc 100 and the arm 110. This will cause relative displacement between the disc 100 and the arm 110, and when the pawl is relieved from the ratchet, the spring 106 or the spring 108 will tend to rotate the disc 100 in the reverse direction. This rotation of the disc 100 in the reverse direction will cause the arm 122 to be rotated in the reverse direction to move either the conductor member 124' or the conductor member 126' from closed circuit relation with its cooperating contact elements to break the circuit of the motor 2.

Figure 8:
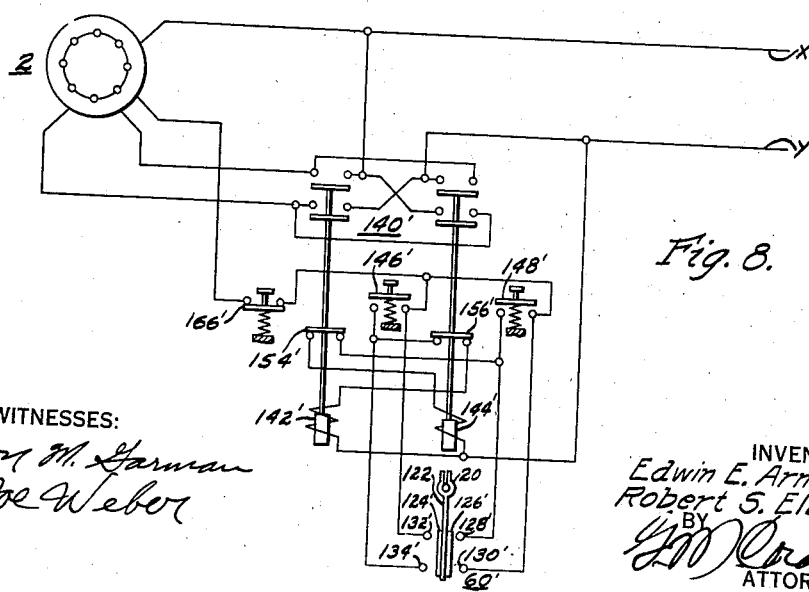
Fig. 8 is a diagrammatic illustration of a control system for actuating the valve operator of Figs. 6 and 7.

In Fig. 8 there is shown a control system which may be used in conjunction with the valve operator shown in Figs. 6 and 7. Referring to Fig. 8, a reversing switch 140' is operated by the relays 142' and 144' which in turn are selectively controlled by the push button switches 146' and 148', respectively. The reversing switch 140' is connected in the circuit of one of the windings of the single-phase induction motor 2 to select the direction of rotation of the motor 2. The conductor element 124' and its associated contact elements 132' and 134' are connected in parallel with the push button switch 146' to provide a holding circuit for the relay 142' after the initial movement of the arm 122 to move the conductor element 124' into engagement with the contact elements 132' and 134'. The contact elements 128' and 130' and their associated conductor element 126' are associated in a like manner with the push buttom switch 148'.

The back contact elements 154' and 156' are provided on the relays 142' and 144', respectively, to provide lock-out circuits for the relays 144' and 142', respectively, so that the motor may not be energized for rotation in both directions at the same time. A normally closed push button switch 166' is provided in the common control circuit of the relays 142' and 144' so that the motor may be deenergized at any desired position.

In the operation of the control system of Fig. 8, the push button switch 146' may be moved to closed circuit position, thus energizing the relay 142' to select the direction of operation of and deenergize the motor 2. When the motor 2 has moved the arm 122 to carry the contact element 124' to closed circuit position with respect to the contact elements 132' and 134', the push button switch 146' may be released and the relay 142' will remain energized through the conductor element 124'. When the motor 2 has driven the valve operated thereby to its extreme limit of travel, the conductor element 124' will be caused to move from closed circuit relation with the contact elements 132' and 134' as hereinbefore explained in the operation of the valve control device of Figs. 6 and 7, deenergizing the relay 142' which in turn will cause deenergization of the motor 2. The valve may be similarly actuated in the reverse direction under control of push button switch 148' and its associated circuits.

It will be seen that we have provided a simple, sturdy and compact valve operating device which will function to actuate the valve to its extreme open or closed position, and, in response to the stopping of the movement of the valve in its extreme closed or open position, will deenergize the motor.

In compliance with the requirements of the patent statutes, we have shown and described herein the preferred embodiments of our invention. It is understood, however, that the invention is not limited to the precise constructions shown and described, but is capable of modification by one skilled in the art, the embodiments herein shown being merely illustrative of the principles of our invention.

We claim as our invention:

1. In a valve operator, a crank member disposed to actuate a valve, means for actuating said crank member, resilient means disposed between said actuating means and said crank member whereby a predetermined stress between said actuating means and said crank member causes relative movement between said actuating means and said crank member, and means responsive to relative movement between said crank member and said actuating means for controlling said actuating means.

2. In a valve controller, a ratchet, a motor, a pawl driven by said motor and cooperating with said ratchet to drive said ratchet step-by-step, a resilient driving connection between said driven ratchet and the valve, said resilient connection having such resistance as to yield appreciably to the driving force applied by said motor through said ratchet to the valve only when the valve has been stopped by reaching the end of its travel, and means whereby the reverse movement of said ratchet under the influence of said resilient connection will stop the rotation of said motor.

3. In a valve controller, a motor, a reciprocating pawl driven by said motor, a ratchet driven step-by-step by said pawl, resilient means connecting said ratchet in driving relation with a valve, said resilient means having such resistance to deformation as to yield appreciably to the driving force applied by said motor through said ratchet to the valve only when the valve has been stopped by reaching the end of its travel, said ratchet being free to be moved in the reverse direction by said resilient means after said resilient means has been appreciably stressed, and circuit control means for said motor operable by said ratchet to maintain said motor energized after movement of said ratchet by said pawl and to deenergize said motor upon reverse movement of said ratchet by said resilient means.

4. In a valve controller, a reversible motor, means comprising a gear train connecting said motor in driving relation with a valve, means for energizing said motor selectively for rotation in a direction to open or close the valve regardless of the position of the valve, holding circuit means for maintaining said motor energized as selected, means responsive to the excessive stress between elements of said gear train when the motion of the valve is obstructed as when the valve has reached its extreme limit of travel in the selected open or closed position for breaking said holding circuit means and thereby deenergizing said motor, and manually operable means for breaking said holding circuit independently of said excessive stress responsive means.

5. In a valve controller, a motor, mechanical means comprising a gear train connecting said motor in driving relation with a valve, circuit control means for energizing said motor to actuate the valve, a holding circuit means for maintaining said motor energized, means actuated upon energization of said motor for completing the holding circuit of said holding circuit means, means responsive to excessive stress between elements of said mechanical means when the motion of the valve is obstructed as when the valve has reached its extreme limit of travel for opening the holding circuit to thereby deenergize said motor and stop the motion of the valve, and manually operable means for breaking said holding circuit independently of said excessive stress responsive means to thereby stop the motion of the valve at any desired valve position.

6. In a valve controller, a motor, a gear train connecting said motor in operative relation with the valve, said gear train comprising a sun gear driven by said motor, a first ring gear and a planet gear driven by said sun gear and engaging said first ring gear, a second ring gear engaging said planet gear and having a different number of teeth from the first ring gear, means connecting said second ring gear to operate the valve, means biasing said first ring gear in a predetermined position, means whereby predetermined turning movement on said first ring gear will cause it to be displaced from said predetermined position, means for energizing said motor selectively for rotation in a direction to open or close the valve, holding circuit means for maintaining said motor energized as selected, means responsive to predetermined displacement of said first ring gear when the movement of the valve is obstructed as when the valve has reached its extreme limit of travel in the selected open or closed position for breaking said holding circuit means and thereby deenergizing said motor, and manually operable means for breaking said holding circuit independently of said displacement responsive means.

7. In a valve operator, a motor, a plurality of planetary gear trains connected in tandem relation between said motor and a valve to be operated by said motor, means biasing one of the ring gears of said planetary gear trains to a predetermined position, means whereby a predetermined value of torque applied to said gear train causes displacement of said one ring gear from said position, means for energizing said motor selectively for rotation in a direction to open or close the valve, holding circuit means for maintaining said motor energized as selected, means responsive to predetermined displacement of said one ring gear when the movement of the valve is obstructed as when the valve has reached its extreme limit of travel in the selected open or closed position for breaking said holding circuit means and thereby deenergizing said motor, and manually operable means for breaking said holding circuit independently of said displacement responsive means.

8. In a valve controller, in combination, a motor, a reduction gear train disposed between said motor and a valve, said gear train including a sun gear, a planet gear and an internal gear disposed in cooperative relationship, means biasing said internal gear to a predetermined position, said biasing means being such as to permit displacement of said internal gear, means for energizing said motor selectively for rotation in a direction to open or close the valve, holding circuit means for maintaining said motor energized as selected, means responsive to predetermined displacement of said internal gear when the movement of the valve is obstructed as when the valve has reached its extreme limit of travel in the selected open or closed position for breaking said holding circuit means and thereby deenergizing said motor, and manually operable means for breaking said holding circuit independently of said displacement responsive means.

EDWIN E. ARNOLD.
ROBERT S. ELBERTY, Jr.